March 8, 1955  E. L. TURNER  2,703,737

SELF-ADJUSTING THRUST BEARINGS

Filed May 15, 1952

INVENTOR.

BY Eugene L. Turner

J. K. Mosser
AGENT

United States Patent Office 2,703,737
Patented Mar. 8, 1955

2,703,737

SELF-ADJUSTING THRUST BEARINGS

Eugene L. Turner, Des Moines, Iowa, assignor to The Maytag Company, Newton, Iowa, a corporation of Delaware Application May 15, 1952, Serial No. 287,855

9 Claims. (Cl. 308—163)

The invention relates to thrust bearings and more particularly to self-adjusting double acting thrust bearings.

In the use of double acting thrust bearings it is quite often difficult to maintain the bearings in proper adjustment to compensate for normal wear, especially when end thrust is applied to the bearings alternately in opposite directions. Should the bearings wear slightly and if proper readjustment is not made, the play or looseness tends to aggravate the situation and the rate of wear on the bearings occurs at an accelerated rate, which in a relatively short time either results in damage to the apparatus or destruction of the bearings. In addition, noise in the form of a knock becomes objectionable upon alternate changes in axial thrust.

In accordance with the invention, a double acting thrust bearing is provided with a pair of spaced thrust collars carried by the shaft. One of the collars is secured to the shaft in any suitable manner to rotate therewith and engage a stationary thrust surface or shoe, while the other thrust collar is mounted on the shaft which not only rotates therewith against a stationary shoe but is adapted to be axially movable in the direction of the shoe and automatically locked against relative movement in the opposite direction. The collars are continuously resiliently biased in the direction of the shoes so as normal wear occurs relative movement between the movable thrust collar and shaft takes place and the thrust collar is always maintained against the shoe at the proper clearance.

Accordingly, it is an object of the invention to provide a double acting thrust bearing with means which automatically compensates for wear of the bearing.

It is another object of the invention to provide a thrust bearing having a stationary shoe with a self-adjusting thrust collar which rotates with the shaft, is freely movable axially in the direction of the shoe but automatically locked in a direction away from the shoe.

It is still another object of the invention to provide a thrust bearing with a self-adjusting thrust collar which has a single means for locking the collar to the shaft to rotate therewith and against axial movement in one direction while permitting free axial movement in the other direction.

It is another object of the invention to provide a double acting thrust bearing having a thrust shoe with an adjustable thrust collar which has a ball type locking element biased into engagement with the shaft and collar by resilient means which also maintains the collar in contact with the thrust shoe.

It is yet another object of the invention to provide a double acting thrust bearing having thrust shoes with a pair of spaced thrust collars held in engagement with the cooperating thrust shoes by spring means which acts through ball type grip elements carried at one of the collars to maintain the collars in engagement with the shoes.

It is another object of the invention to provide a double acting thrust bearing with an adjustable thrust collar having ball type grip elements which limit relative motion between the shaft and collar to one direction only.

Other objects, features, capabilities, and advantages are comprehended by the invention as will later appear and as are inherently possessed thereby.

Referring to the drawings.

Figure 1:
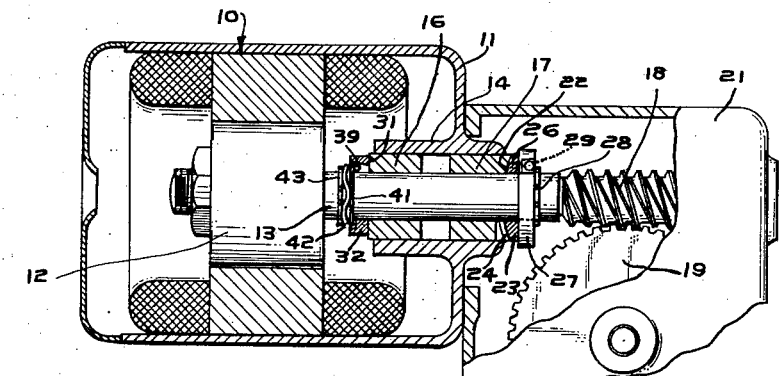
Figure 1 is a partial longitudinal vertical sectional view of a mechanism to which the improved self-adjusting thrust bearing is applied.
Figure 2:
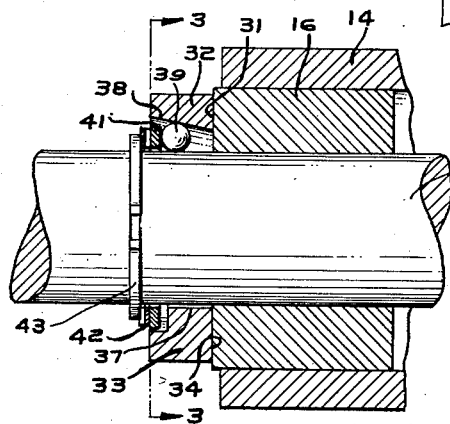
Figure 2 is an enlarged longitudinal sectional view of the self-adjusting thrust bearing shown in Figure 1.

Referring now to Figures 1 to 4 of the drawings for an embodiment of a self-adjusting double acting thrust bearing applied to suitable apparatus, there is shown a motor 10 having the usual stator or housing 11 surrounding a rotor 12 and a rotor shaft 13 extends outwardly therefrom through a hub 14 formed as part of the housing 11. The rotor shaft 13 is journalled in a pair of spaced radial bearings 16 and 17 press fitted into the surrounding hub and, in the modification shown, the outer end of the shaft 13 is provided with a worm 18 for driving a worm wheel 19 mounted in a gear housing 21, which is adapted to drive oscillating mechanism (not shown) for oscillating the agitator of a washing machine.

When a motor or the like is operating under load, an axial end thrust on the shaft is developed which is usually predominant in one direction, and in most instances an end thrust of this type may be readily compensated for by any one of a number of relatively simple thrust bearing arrangements; however, under other operating conditions there are drive arrangements wherein the axial end thrust may be alternately applied to the shaft from opposite directions, and it is to an arrangement of this latter type that this invention is primarily directed.

Referring to Figure 1, the outer face of the outer radial bearing 17 has a spherical seat 22 for engaging an annular stationary thrust shoe 23 having a mating spherical surface to provide for self-alignment, and the spherical seat and shoe preferably include a loose interlocking connection 24 to limit relative rotary movement. The opposite face of the thrust shoe has a flat radial annular surface 26 to provide a bearing contact surface mating with a radial face or surface on a first or fixed thrust collar 27. This thrust collar is attached or secured to the shaft 13 to rotate therewith in any suitable manner and, in this instance, a snap or locking ring 28 carried in a groove in the shaft provides the stop to limit the outward axial movement of the fixed collar 27, and a ball type grip element 29 carried in a groove in the collar is adapted to lock the shaft and collar together to rotate in unison in either direction of rotation. Any other suitable means may be utilized for locking the fixed collar 27 to the shaft 13.

The inner radial bearing 16 has an inner annular radial face providing a stationary thrust surface or shoe 31 which is engaged by an annular adjustable second or movable thrust collar 32 loosely surrounding the shaft 13 and longitudinally movable with respect to the same. This thrust collar comprises a body portion 33 having a forwardly projecting annular radial face or surface 34 adapted to be held in contact with the stationary radial thrust surface 31, and its inner periphery 36 surrounding the shaft is undulated, as viewed in Figure 3, to provide a plurality of equal and alternately spaced crests and troughs 37 and 38, respectively, which constitute circumferential camming surfaces and space for the reception of locking or gripping means in the form of balls 39. In addition, each trough 38 is slightly tapered upwardly and outwardly toward the back of the collar, as viewed in Figure 2, to provide a plurality of spaced longitudinal inclined races or surfaces. Each trough 38 carries a single locking element or ball 39 and they are held in their respective troughs by means of a back-up member or washer 41 which in turn is biased in the direction of the stationary thrust surface 31 by means of an annular resilient member or spring 42. The spring abuts against a suitable abutment provided on the shaft, such as, for example, a snap ring 43 carried in a groove formed in the shaft 13 outwardly from the rear face of the adjustable thrust collar 32.

From the foregoing it can be seen that when the rotor and bearing unit is assembled, the spring 42, acting against the abutment surface 43 will move or tend to move the shaft 13 to the left, as viewed in the drawings. In so doing, the outer abutment 28 will hold the fixed thrust collar 27 into engagement with its respective stationary shoe 23. At the same time, the spring 42 also reacts on the adjustable thrust collar 32, through the washer 41 pressing against the balls 39, to move its radial face 34 into contact with its respective stationary thrust surface 31 and the balls 39 are forced forwardly toward the bottom or narrowed end of their respective troughs.

As shown, should an axial force be applied from the right, as viewed in the drawings, the locked or fixed thrust collar 27 transmits the load directly to the housing through its respective shoe 23 and the adjustable thrust collar 32 carries none of the load, but is maintained against its thrust surface 31 by the resilient means 42. Now, when the axial load or force on the shaft is in the opposite direction or from the left, as the shaft 13 starts to move axially there is a slight relative movement between the shaft and the movable collar 32. With the movable collar held against the stationary thrust face 31, the shaft moves outwardly or to the right slightly, and this relative movement rotates or slides the balls 39 down the inclined longitudinal planes or camming surfaces in their respective troughs 38 which results in a positive lock between the collar 32 and the shaft 13 to stop further relative movement. Thereafter the transmittal of axial load from the shaft is directly through the locking balls 39 and collar 32 to the stationary thrust surface 31. The slight rollback of the locking balls 39 provides the proper running clearance for the thrust bearings.

From the foregoing it can be seen that, as the double acting thrust bearing wears and as clearance or looseness tends to develop between the thrust surfaces, the adjustable thrust collar 32 is automatically moved axially with respect to the shaft by means of the spring 42 acting through the locking balls 39 to compensate for such wear and always maintain the proper clearance between the stationary thrust surfaces 31 and 26 under all conditions of operation. An important advantage in a construction of this type is that backlash is taken up as wear occurs and, with automatically maintaining a small clearance between the thrust surfaces, the noise level is reduced considerably when the direction of the end thrust reverses.

In order to provide means for insuring rotation of the adjustable thrust collar 32 with the shaft 13, the undulated periphery 36 is such as to permit slight relative rotation between the collar and shaft until the locking balls 39 move or roll into locking engagement with the peripheral camming surfaces provided by the alternate crests and troughs 37 and 38 to thereby prevent further relative movement. With the arrangement shown, the self-adjusting collar is locked to the shaft 13 to rotate therewith upon either direction of rotation and, in view of the fact the troughs are tapered inwardly, the locking balls are still capable of permitting relative axial movement of the thrust collar 32 in the direction of the stationary shoe 31 while maintaining the collar locked with respect to rotary movement. An arrangement of this type is particularly important in installations wherein the shaft has been hardened and it may be rather difficult or undesirable to grind or drill the shaft.

Thus, a self-adjusting thrust collar has been provided wherein the locking balls are effective to lock the collar to the shaft for rotary movement and axial movement in one direction, but permits relative axial movement of the collar in the other direction.

Figure 4:
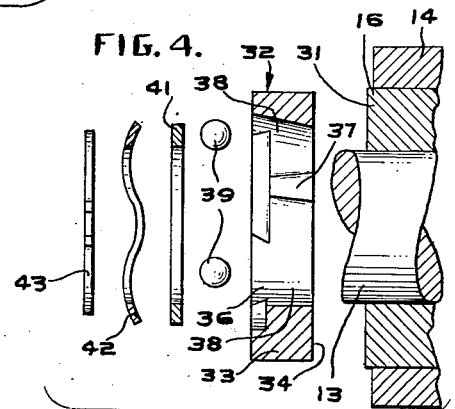
Figure 4 is an exploded longitudinal sectional view of the self-adjusting thrust bearing shown in Figures 1 to 3.
Figure 3:
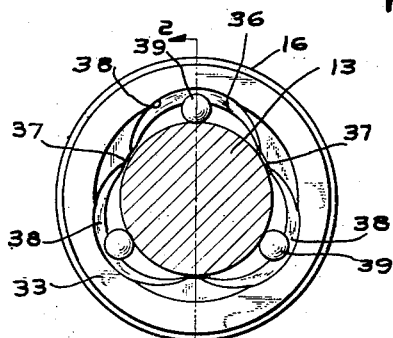
Figure 3 is a transverse vertical sectional view taken along the line 3—3 of Figure 2 showing the improved locking means for the self-adjusting thrust collar.
Figure 5:
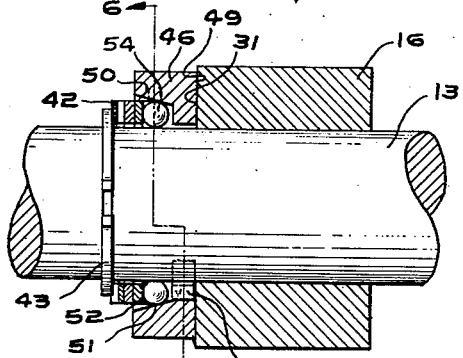
Figure 5 is a longitudinal sectional view of a modified self-adjusting thrust bearing construction; and, Figure 6 is a transverse vertical sectional view taken on the line 6—6 of Figure 5.
Figure 6:
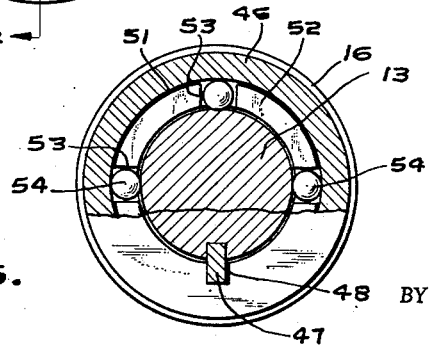

In Figures 4 and 5 there is shown a slightly modified construction for a self-adjusting thrust collar 46 which is loosely mounted on the shaft 13 adjacent the radial surface 31 on the inner bearing 16. Since the fixed thrust collar 27 and other elements are similar in construction, location and function, further description of the common elements or parts is not deemed necessary. In this instance, the adjustable collar 46 is rotated in unison with the shaft by means of a suitable key or the like 47 carried by the shaft and loosely fitting in a slot 48 in the collar, and its forward radial face 49 is adapted to contact the stationary radial shoe or surface 31 on the inner bearing. The opposite face of the adjustable thrust collar 46 is recessed adjacent the shaft to provide an annular open pocket 50 which has its outer periphery 51 tapered inwardly, as viewed in Figure 5, toward the closed or forward end 49 to provide a longitudinal camming surface. Within this recess is mounted a ball carrying cage or back-up member 52 having a plurality of equally spaced pockets or notches 53 cooperating with the shaft 13 and periphery 51 of the recess in the adjustable collar 46 to hold a plurality of locking or gripping balls 54 in spaced relation about the circumference of the shaft 13.

The cage 52 and locking balls 54 are maintained in the recess 50 by resilient means, such as, for example, the annular spring 42 which reacts between the abutment or snap ring 43 on the shaft and the back of the cage 52 and through the locking balls 54 to force the thrust collars 27 and 46 against their respective thrust surfaces 26 and 31, respectively, to maintain them at the proper running clearance.

As in the first modification, with the spring 42 acting through the cage 52 and the locking balls 54 to hold the thrust collar 46 against the shoe 31, when the direction of the axial thrust is such as to act against the adjustable collar 46, the slight relative axial movement between the shaft and collar causes the locking balls 54 to move on the camming surface 51 to securely grip the shaft and collar to prevent further relatively axial movement. Also, any wear on the thrust bearings is automatically compensated for because the spring acting through the cage and balls is always such as to move and hold the thrust collars against their respective shoes. The advantages of this modification are as in the first described arrangement, except in this instance the shaft 13 has been slotted to carry the key 47 to provide the means for rotating the collar 46 in unison and no dependence is relied on the locking balls 54 for rotating the adjustable collar.

From the foregoing it can be seen that a self-adjusting double acting thrust bearing has been provided which is relatively simple in construction, automatically maintains the proper clearance between the thrust shoes as wear occurs, and that one of the thrust collars is automatically movable relative to the shaft in one direction but securely locked to the shaft upon motion in the other direction so as to transmit the full thrust load directly from the shaft to the thrust shoe.

While I have herein described and upon the drawings shown illustrative embodiments of the invention, it is to be understood that the invention is not limited thereto but may comprehend other constructions, arrangements of parts, details and features without departing from the spirit of the invention.

It is claimed:

1. In a self-adjusting thrust bearing, the combination of a rotatable shaft, a recessed thrust collar mounted on said shaft to rotate therewith, a thrust surface engaged by said collar, a ball carried in said recessed collar for locking said collar and shaft against relative axial movement in one direction, and resilient means for biasing said collar toward said thrust surface.

2. In a self-adjusting thrust bearing, the combination of a housing, a rotatable shaft journalled in said housing, a stationary thrust surface surrounding said shaft, a thrust collar loosely mounted on said shaft, means for urging said collar in the direction of said stationary thrust surface, and locking means carried between said shaft and collar permitting said collar to move axially along said shaft in one direction towards said surface but locking said collar to said shaft when an axial force is applied in the same direction to said shaft.

3. In a self-adjusting thrust bearing, the combination of a housing, a rotatable shaft in said housing, a stationary thrust surface surrounding said shaft, an adjustable thrust collar mounted on said shaft, one-way locking means between said shaft and collar to permit axial movement of said collar in the direction of said thrust surface but to prevent is axial movement in the opposite direction, and resilient means acting through said locking means for urging said collar toward said thrust surface.

4. In a self-adjusting thrust bearing, the combination of a housing, a shaft journalled in said housing, a pair of spaced stationary thrust shoes associated with said housing, a pair of thrust collars carried by said shaft for engaging said thrust shoes, one of said collars being fixed to said shaft and the other of said collars being adjustable axially with respect to said shaft, resilient means for urging said adjustable collar toward one of said thrust shoes, and locking means between said shaft and adjustable collar to permit axial movement of said adjustable collar towards said one shoe when axial force is applied to said shaft in one direction but locking said adjustable collar and said shaft together when axial force is applied to said shaft in an opposite direction.

5. In a self-adjusting thrust bearing, the combination of a housing, a shaft journalled in said housing, a pair of spaced stationary thrust shoes associated with said housing, a pair of spaced thrust collars carried by said shaft for engaging said shoes to limit axial movement of said shaft, one of said collars being fixed to said shaft to rotate therewith and the other of said collars being axially adjustable with respect to said shaft, locking balls disposed between said shaft and adjustable collar to lock said shaft and adjustable collar together to transmit thrust to said shoe when said shaft is axially loaded in one direction, and resilient means for urging said collars against said shoes through said locking means.

6. In a self-adjusting thrust bearing, the combination of a housing, a rotatable shaft extending through said housing, a stationary thrust surface surrounding said shaft, an adjustable thrust collar mounted on said shaft and having a tapered annular recess opening toward the same, a plurality of spaced locking balls disposed in said recess to lock said collar to said shaft to transmit axial thrust to said shoe through said collar in one direction and to permit relative axial movement of said collar in the opposite direction, and resilient means for urging said collar in the direction of said shoe through said locking balls.

7. In a self-adjusting thrust bearing, the combination of a housing, a rotatable shaft extending through said housing, a stationary thrust surface surrounding said shaft, an adjustable thrust collar mounted on said shaft and having a tapered annular recess opening toward the same, means for rotating said collar with said shaft, a plurality of spaced locking balls disposed in said recess to lock said collar to said shaft to transmit axial thrust to said shoe in one direction and to permit relative axial movement of said collar in the direction of said thrust surface, and resilient means for urging said collar in the direction of said shoe through said locking balls.

8. In a self-adjusting thrust bearing, the combination of a housing, a rotatable shaft extending through said housing, a stationary thrust surface surrounding said shaft, an adjustable thrust collar mounted on said shaft and having a recess opening toward the same, said recess having an undulated periphery providing a plurality of crests and troughs with said periphery being inwardly tapered in the direction of said shoe, a locking ball disposed in each trough and movable to lock said collar and shaft for rotation in either direction and against axial movement in a direction away from said shoe, said locking balls permitting said collar to move axially with respect to said shaft in the direction of said shoe, means for retaining said balls in said troughs, and resilient means carried on said shaft for urging said collar into engagement with said shoe through said locking balls.

9. In a self-adjusting thrust bearing, the combination of a housing, a shaft journalled in said housing, a pair of spaced stationary thrust shoes associated with said housing, a pair of spaced thrust collars carried by said shaft for engaging said shoes to limit axial movement of said shaft, one of said collars being fixed to said shaft and the other of said collars being axially adjustable with respect to said shaft, said axially adjustable thrust collar being provided with a recess opening toward said shaft, said recess having an undulated periphery providing a plurality of crests and troughs with said periphery being inwardly tapered in the direction of said shoe, a locking ball disposed in each trough and movable to lock said collar and shaft for rotation in either direction and against axial movement in a direction away from said shoe, said locking balls permitting said collar to move axially with respect to said shaft in the direction of said shoe, means for retaining said balls in said troughs, and resilient means carried by said shaft for urging said collars against said shoes through said locking balls.

References Cited in the file of this patent

UNITED STATES PATENTS

| | | |
|---|---|---|
| 147,503 | Johnson | Feb. 17, 1874 |
| 1,835,991 | Runge | Dec. 8, 1931 |
| 2,212,717 | Penn | Aug. 27, 1940 |
| 2,588,126 | Kurtz | Mar. 4, 1952 |

FOREIGN PATENTS

| | | |
|---|---|---|
| 611,874 | Germany | Apr. 8, 1935 |